Aug. 12, 1969 S. C. MILLSAPPS, JR 3,460,638
RAISE DRILLING APPARATUS
Filed Oct. 10, 1966 14 Sheets-Sheet 8

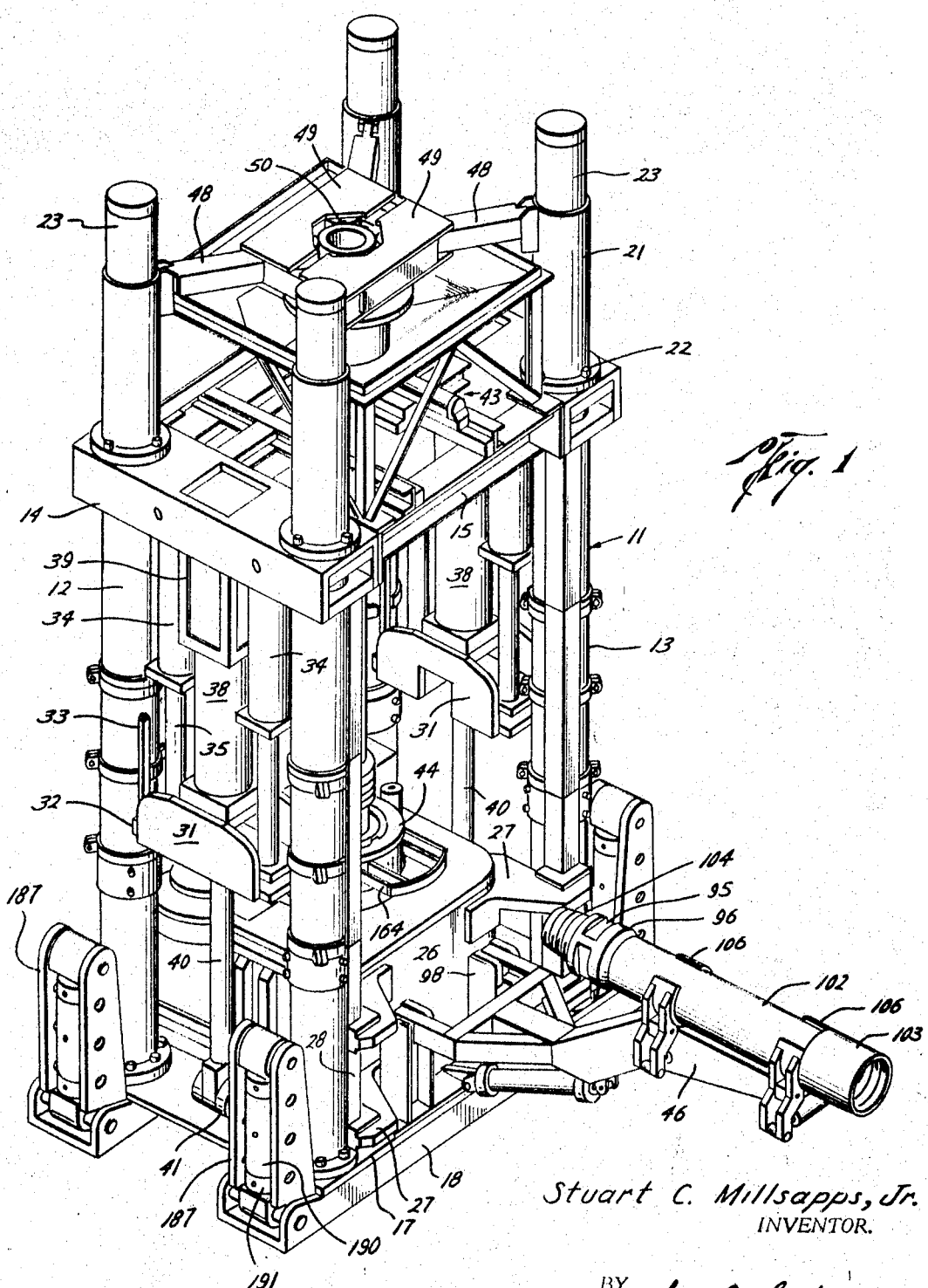

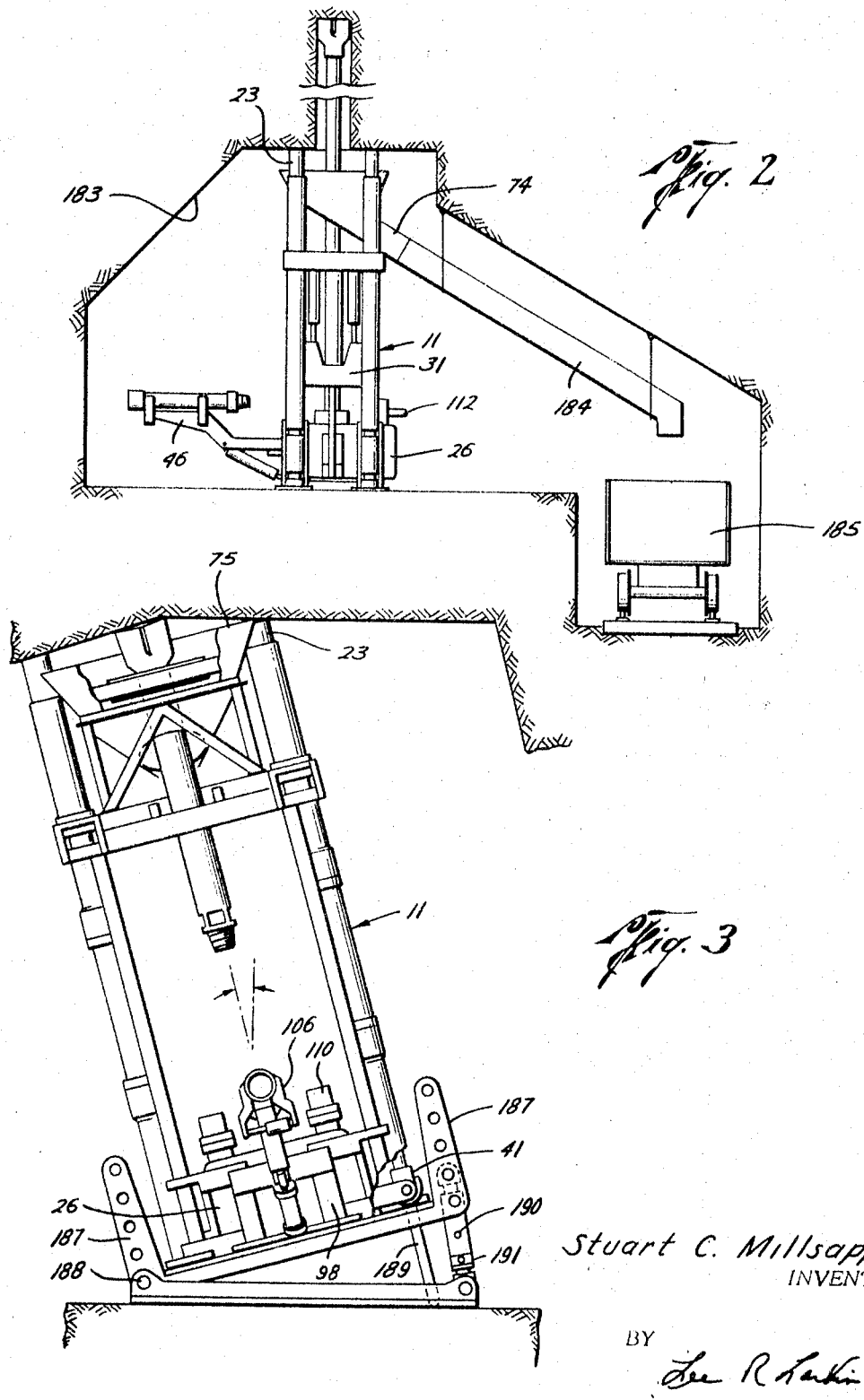

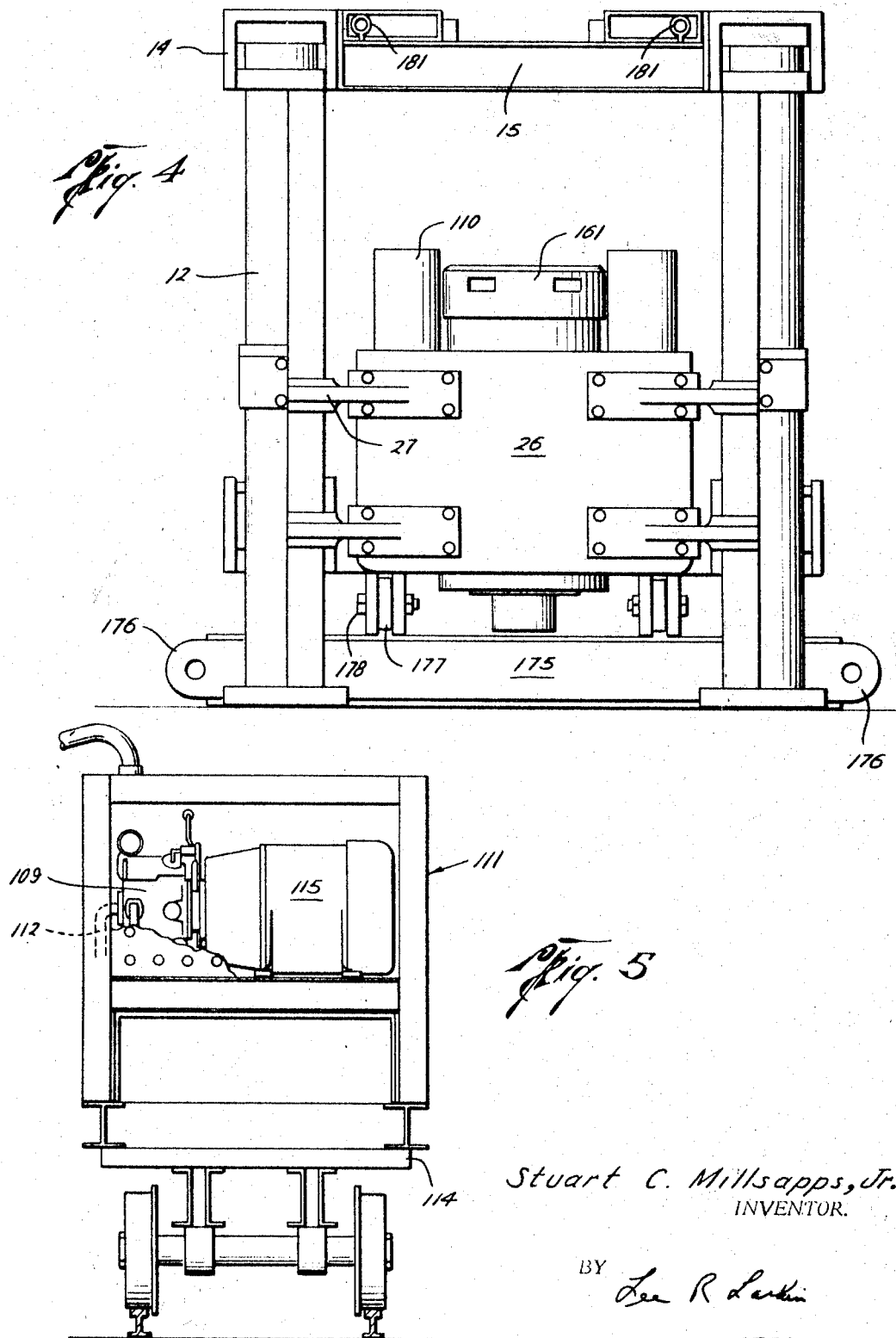

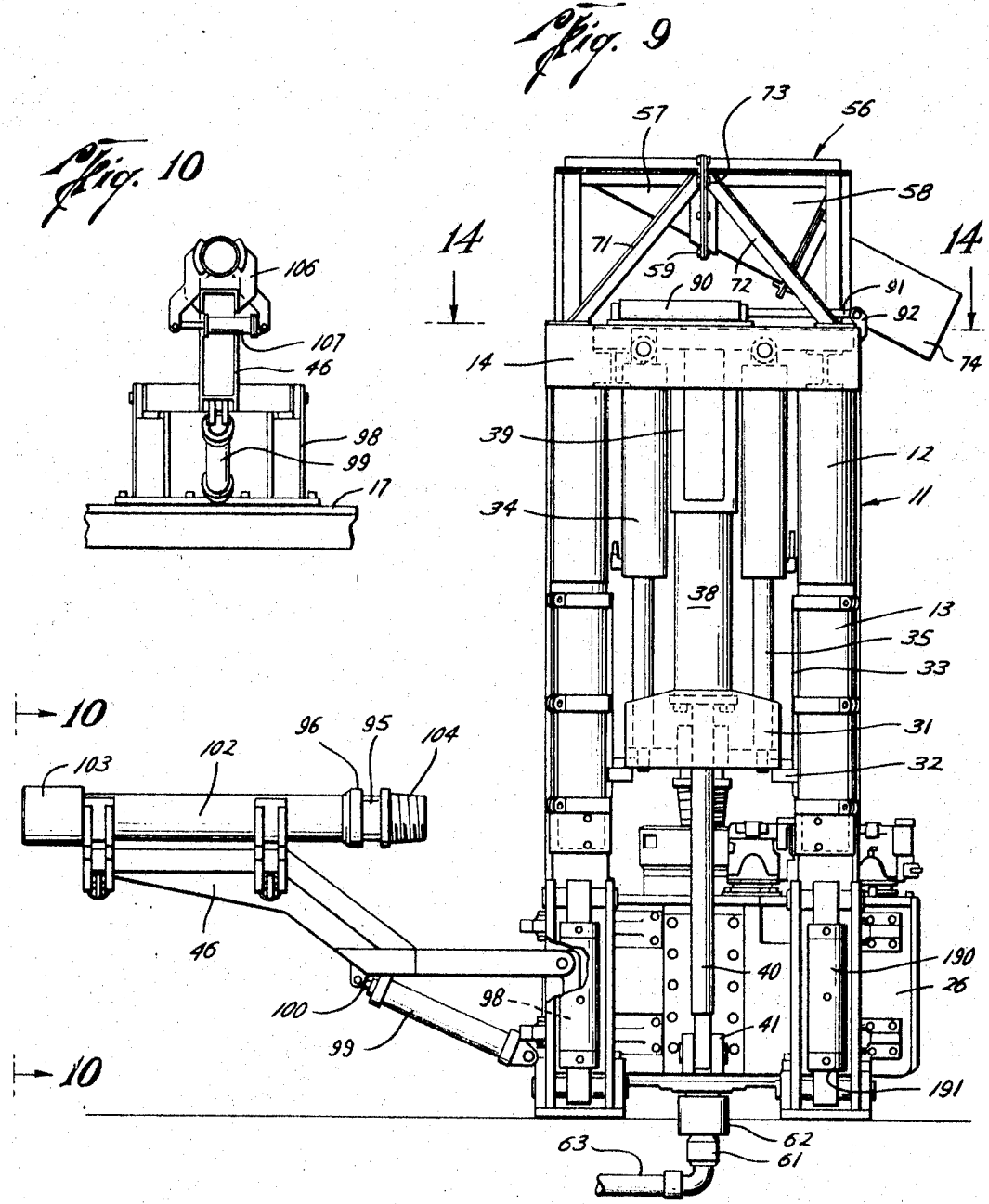

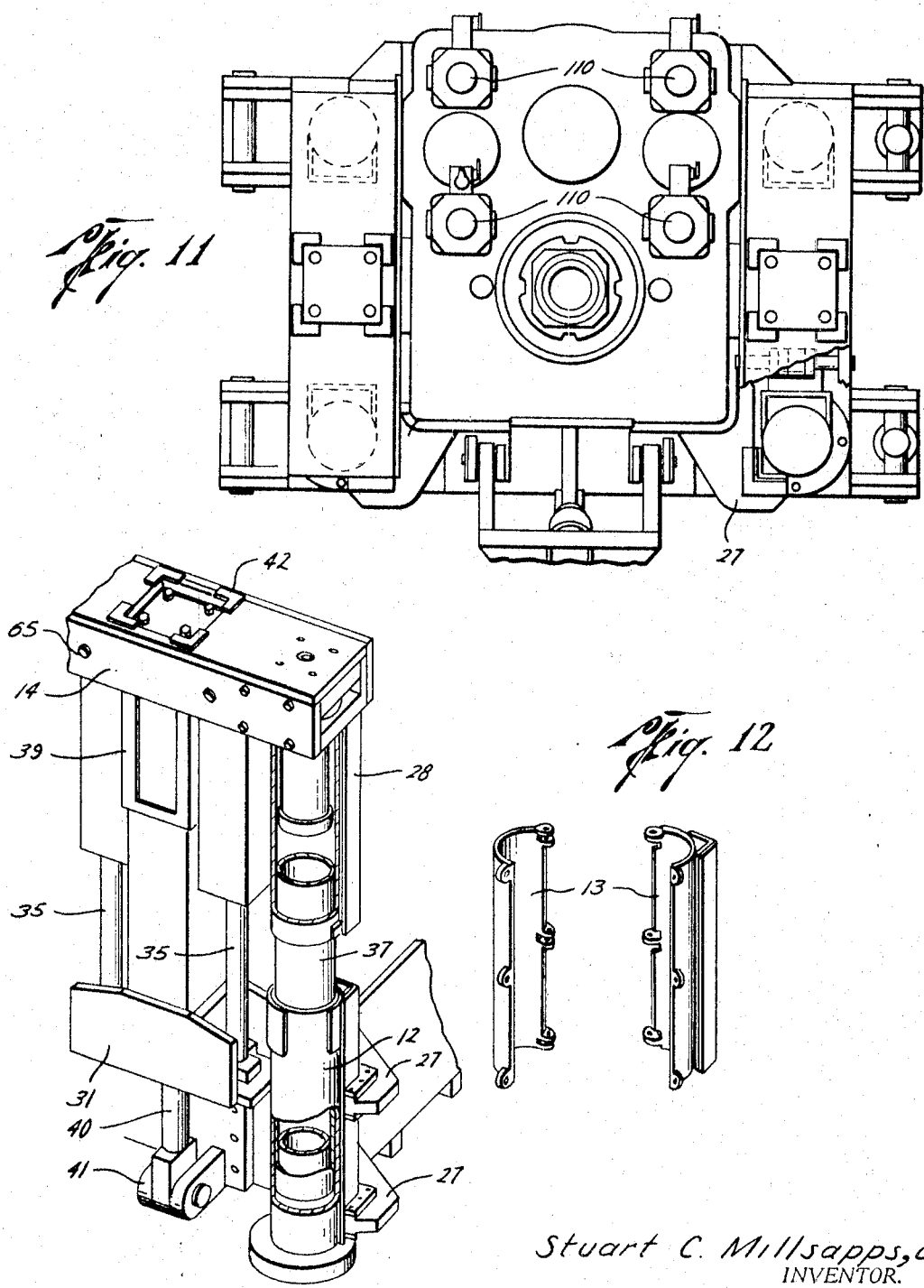

Stuart C. Millsapps, Jr.
INVENTOR.

BY Lee R. Lankin
ATTORNEY

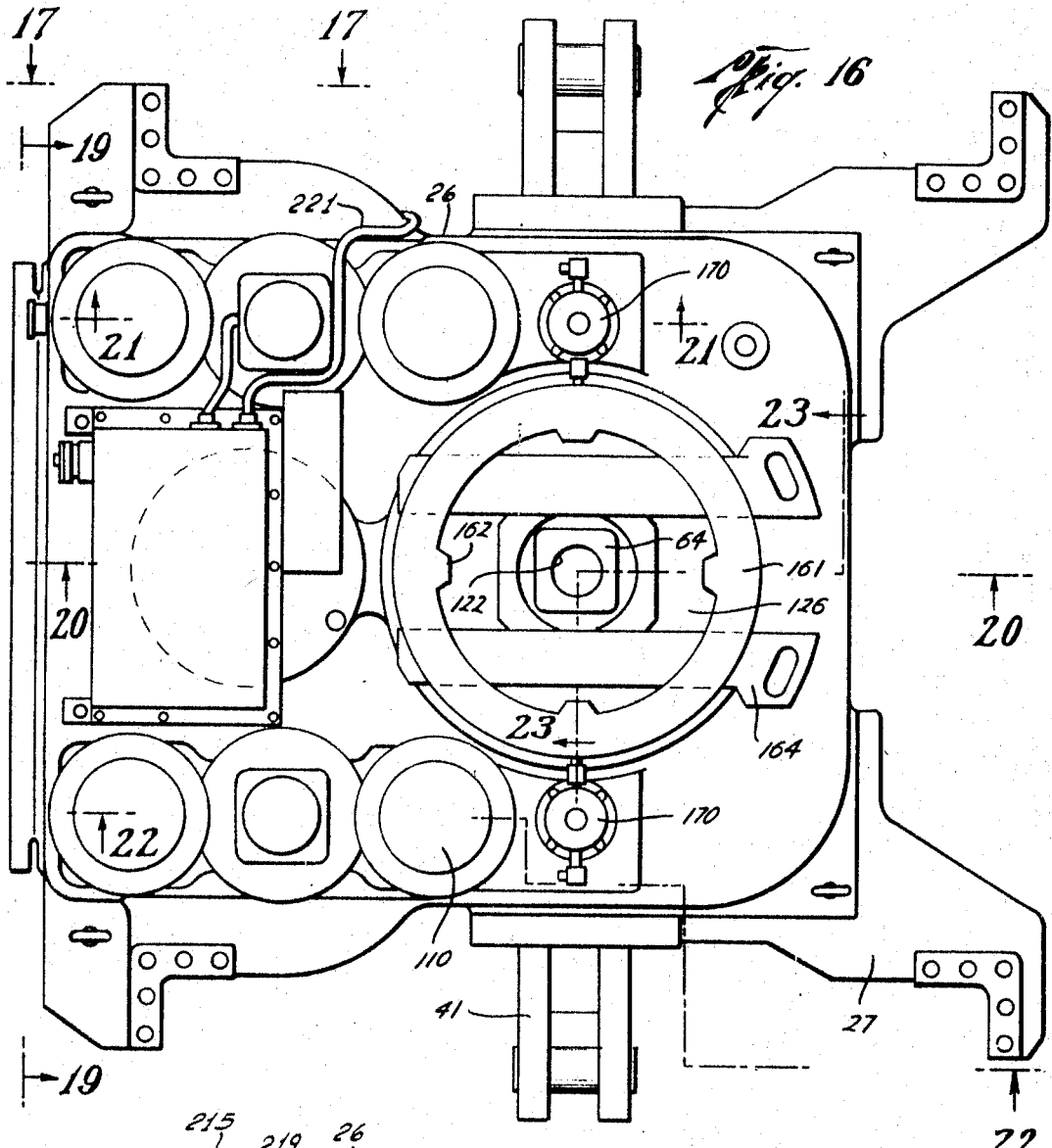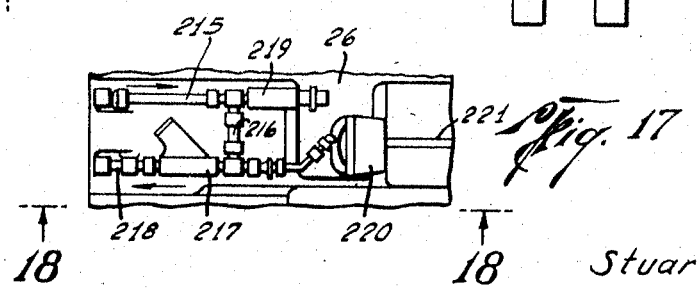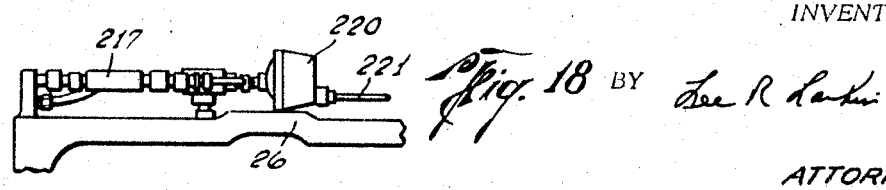

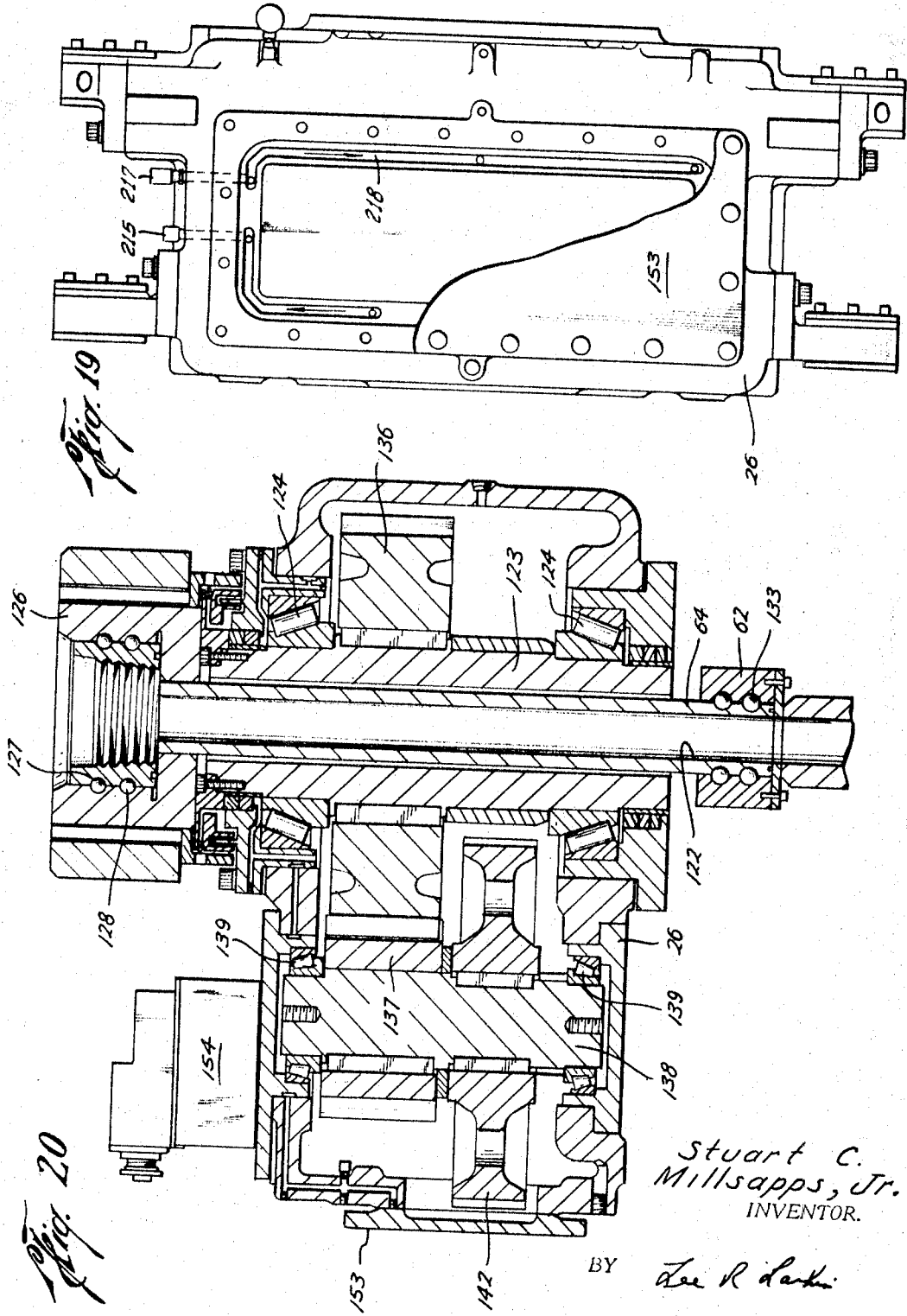

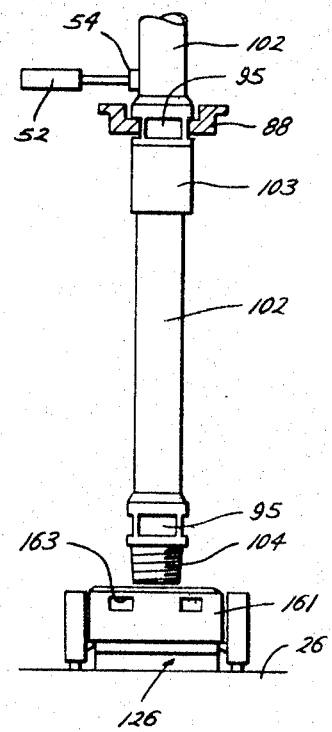
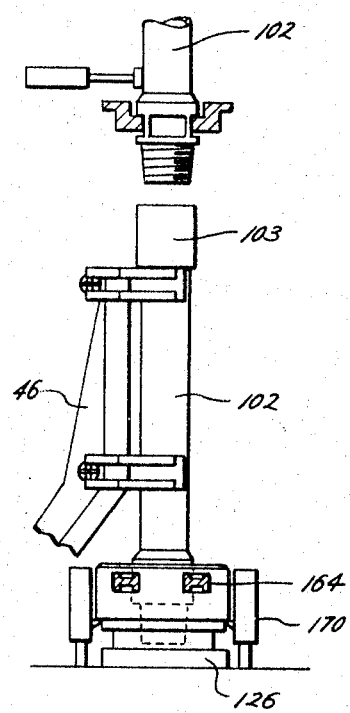
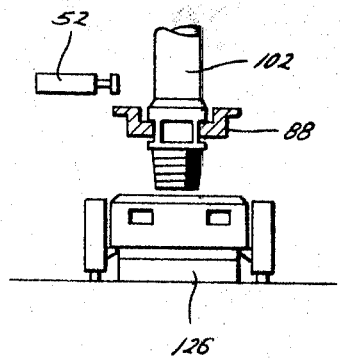
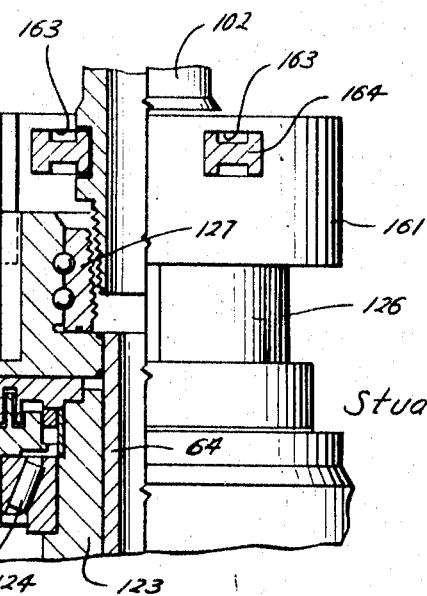

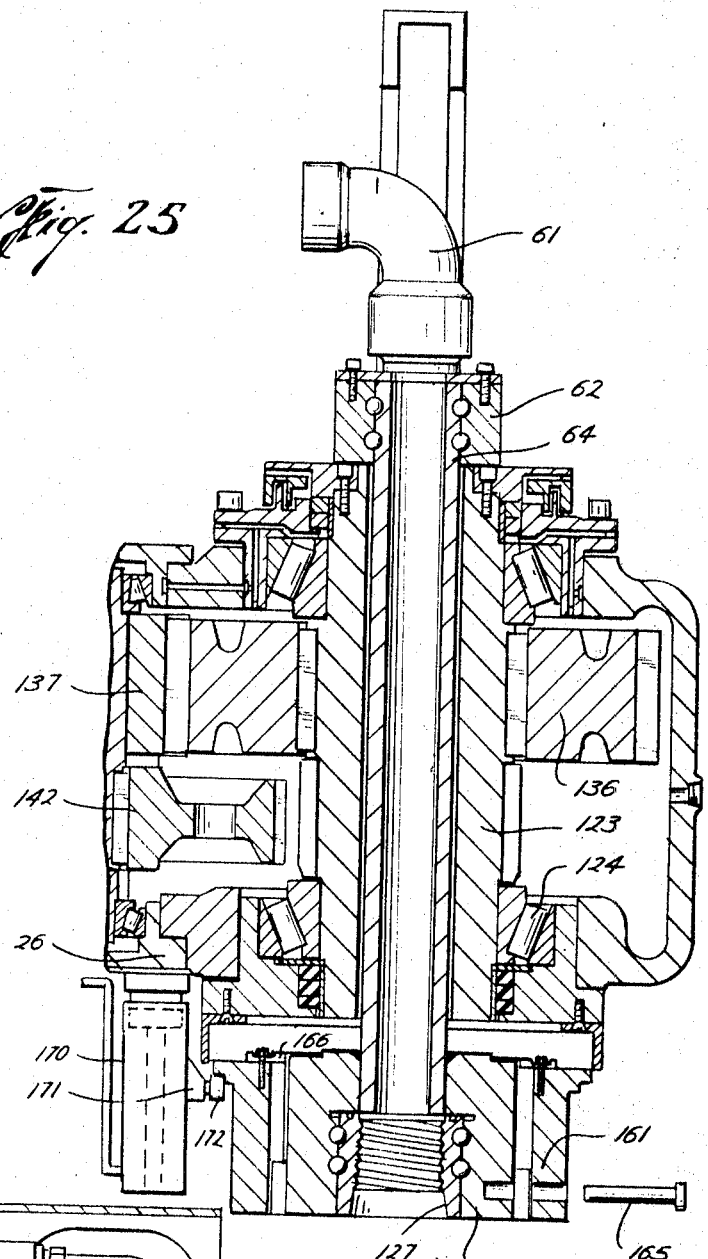
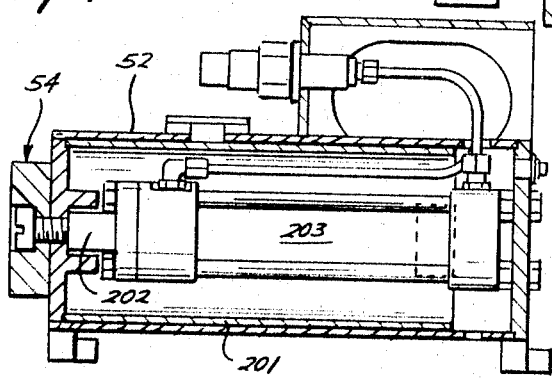

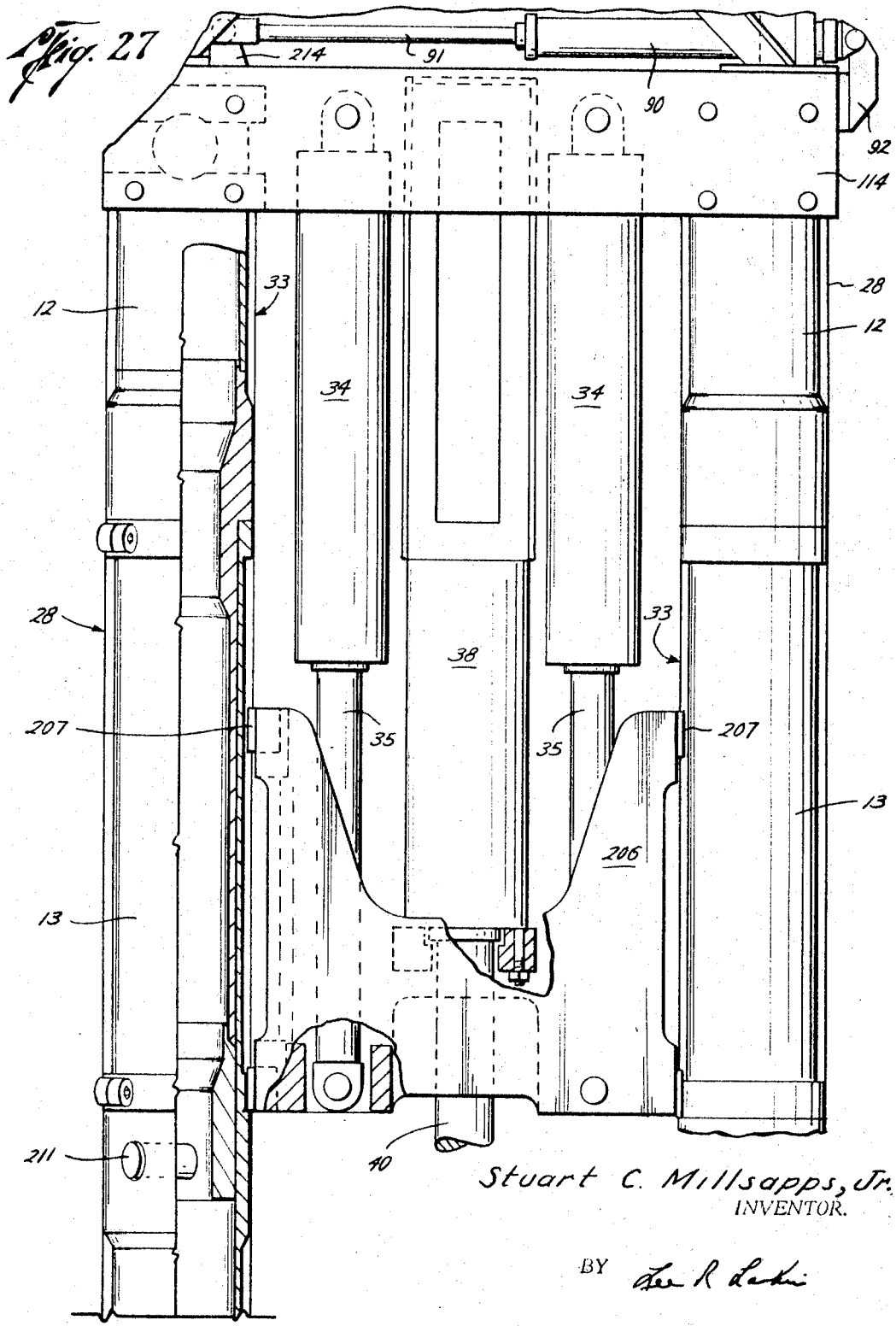

United States Patent Office 3,460,638
Patented Aug. 12, 1969

3,460,638
RAISE DRILLING APPARATUS
Stuart C. Millsapps, Jr., Houston, Tex., assignor to Hughes Tool Company, Houston, Tex., a corporation of Delaware
Filed Oct. 10, 1966, Ser. No. 585,458
Int. Cl. E21b 19/00, 41/00; E21c 11/00
U.S. Cl. 175—85                                  21 Claims

ABSTRACT OF THE DISCLOSURE

A raise drilling apparatus useful for drilling raise holes in mines between upper and lower levels. It is arranged such that it may drill either upwardly or downwardly. It generally, includes a frame and a carriage movable vertically therein, with the carriage having drive means for rotating a kelly connected to a drill string. Wrench means are provided both on the carriage and on the frame for making up and breaking out sections of the drill string.

This invention relates to a raise drilling apparatus. More particularly, this invention relates to a drilling apparatus useful in drilling raise holes in mines between upper and lower levels, for example.

The purpose of the raise drill is to bore large diameter holes from one level in a mine to a second level approximately two hundred (200) feet above or below the first. The apparatus must be capable of boring holes that angle up to 25° from the vertical.

One of the basic problems encountered in the design of mine drilling equipment involves the sizing of heavy drilling machinery so that it may be moved through relatively small tunnels and elevators. The machine must also be capable of being set up at the drill site in a reasonably short period of time with a minimum of additional equipment.

In addition, the rotation of a rotary bit which is used to ream a raise hole requires considerable torque power, and yet it is desirable to provide this torque power with minimum sized equipment and with power means which can be conveniently moved in the mine. Moreover, it is desirable to have an apparatus which is adaptable for drilling either upwardly or downwardly.

During raise hole drilling operations, it is the usual custom to drill a guide bore, either up or down, and thereafter ream a larger hole either down or up, respectively.

It is also desirable to have convenient means by which sections of the drill stem may be added to or removed from the drill stem during drilling operations.

The prior art has many examples of apparatuses which have been developed in attempts to solve the foregoing problems, none of which have been as successful as the present invention. Patents which are generally illustrative of the prior art include German Letters Patent No. 648,438 dated July 8, 1937, and U.S. Letters Patent No. 2,837,324, No. 2,979,320, No. 3,220,494, and No. 3,231,029.

It is, therefore, an object of this invention to provide an improved raise drilling apparatus which is particularly useful in mine raise drilling, and which provides solutions to the foregoing problems.

Briefly stated, this invention is for a raise drilling apparatus comprising a drill frame having a base and upper end section. Movable carriage means are mounted in the drill frame for generally up and down movement therein. Power means are connected to the drill frame for moving the carriage means up and down relative to the drill frame. Rotary drive means including a kelly are mounted in the carriage for rotation of a rotary drill string supported in the drill frame. Pipe joint wrench means are associated with the drill frame for holding the drill string from rotation when adding and removing sections of the drill string. The wrench means preferably includes one chuck means connected to the frame and one to the carriage for make up and breakout of pipe.

In the preferred embodiments of the invention, the drill frame is arranged for telescopic movement whereby it can be expanded to an increased height when it is in operation and collapsed to a reduced height for movement purposes. The preferred embodiment of the invention also includes pipe loading means connected to the drill frame for supporting pipe sections during addition to or removal of the pipe sections in the drill string, and anchor means for securing the drill frame in a fixed position.

Reference to the drawings will further explain the invention wherein like numerals refer to like parts and in which:

FIG. 1 is a perspective view of one embodiment of the apparatus of this invention showing it in the assembled and operating condition.

FIG. 2 is a side elevation view showing the apparatus installed in a mine for drilling an upwardly extending perpendicular pilot bore hole, which may thereafter be reamed downwardly.

FIG. 3 is a front elevation view of the apparatus of this invention tilted preparatory to drilling a pilot bore hole at an angle deviating from the vertical, as for example, 25° from the perpendicular.

FIG. 4 is a side elevation view of the embodiment shown in FIG. 1 collapsed and partially dismantled for movement through a mine tunnel, for example.

FIG. 5 is an end elevation view of a remote power source in the form of a rail car having a power plant mounted thereon.

FIG. 9 is a side elevation view of the apparatus shown in FIG. 8, with part of the assemblies on the upper end removed for purposes of clarity.

FIG. 10 is a view taken at line 10—10 of FIG. 9 showing the pipe loading means of the invention.

FIG. 11 is a view taken generally at line 11—11 of FIG. 8 showing details of one embodiment of the carriage means in relation to the drill frame.

FIG. 12 is a fragmentary and partially broken away view of one corner of the drill frame shown in FIG. 1, illustrating in greater detail one embodiment of the telescoping feature of the drill frame.

FIG. 16 is a top plan view of another embodiment of the carriage means, which is generally similar to the carriage means shown in FIG. 11 and the operation of which is substantially the same, but which in particular is provided with a rear door for entrance to the inside of the gear box rather than a top plate.

FIG. 17 is a view taken at line 17—17 of FIG. 16 showing certain of the valving arrangements for operation of the rotary drive means.

FIG. 18 is a view taken at line 18—18 of FIG. 17.

FIG. 19 is a view taken generally at line 19—19 of

FIG. 16 showing the door on the end of the carriage means or gear box.

FIG. 20 is a cross-sectional view taken at line 20—20 of FIG. 16 and generally showing part of the gear train arrangement of the rotary drive means.

Figure 21:
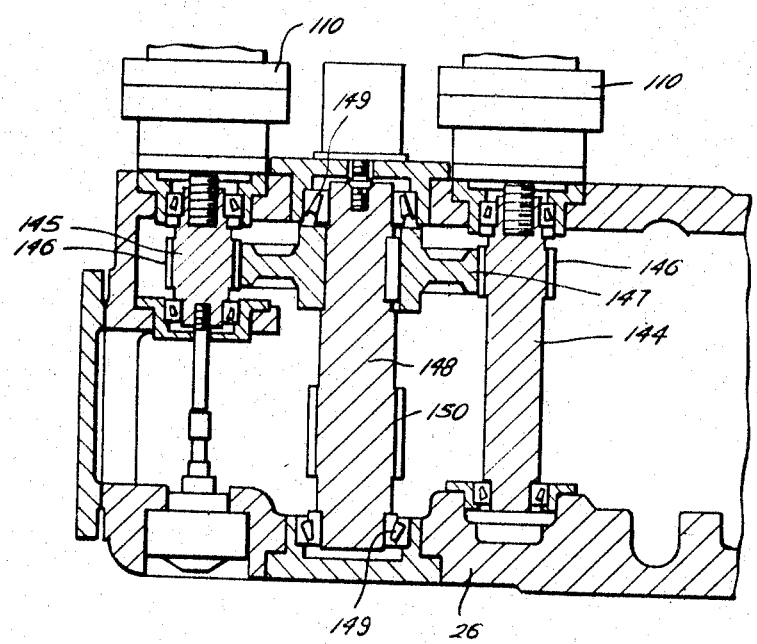

FIG. 21 is another cross-sectional view taken generally at line 21—21 of FIG. 16 showing an additional portion of the rotary drive means.

Figure 22:
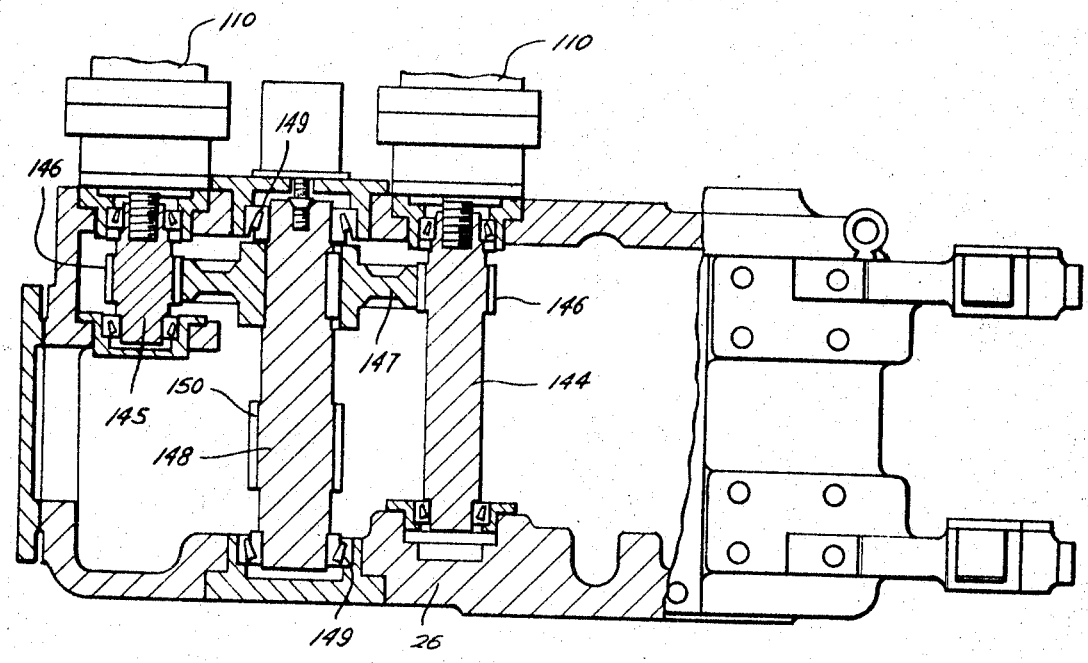

FIG. 22 is another cross-sectional view taken generally at line 22—22 of FIG. 16 showing additional portions of the rotary drive means.

FIG. 23 is a fragmentary and enlarged view taken generally at line 23—23 of FIG. 16 showing in greater detail the arrangement of the lower wrench or chuck means of the apparatus.

FIGS. 24A, 24B and 24C are schematic drawings showing the operation of the pipe joint wrench means and the pipe loading means of the apparatus in sequential operation.

FIG. 25 is a partial sectional view similar to FIG. 20, but showing the rotary drive means adapted for drilling downwardly.

FIG. 26 is a central sectional view of one form of pipe centralizer.

FIG. 27 is a partial front elevation view of another embodiment of this invention showing in particular a different design for the yoke means, the telescoping columns, and the upper chuck means.

FIG. 1 shows one embodiment of the apparatus of this invention at it might be positioned in a mine cavern, for example. It is comprised of a drill frame generally indicated by the numeral 11, which is comprised of a plurality of telescoping uprights in the form of four columns 12, one of which is arranged at each corner of the apparatus. Columns 12 are each provided with a telescoping slipjoint as will be explained hereinafter, whereby the columns may be extended to the position shown in FIG. 1 and a pair of removable column sections 13 fitted thereabout to provide the columns with rigidity so that frame 11 will be held in the extended position.

Columns 12 are joined at their upper ends by a pair of load bearing channels 14 on the sides of the drilling apparatus and are connected by a pair of upper frame members 15. In the installed position as shown in FIG. 1, and as will be explained hereinafter, the lower ends of columns 12 are attached to an upper base 17 which is supported on lower base 18.

The apparatus is also provided with anchor means for securing the drill frame in a fixed position during drilling of raised holes. In the drilling of raise holes upwardly, it is desirable that the anchor means be associated with the upper end of the drill frame, such as that shown in FIG. 1. In this instance, there are four jacksleeves 21 bolted to the upper sides of channels 14 and are generally co-axially aligned over the upper ends of columns 12. Jacksleeves 21 are secured by bolts 22 which are removable whereby the anchor means may be removed during movement of the drill apparatus from one location to another. Each of the jacksleeves 21 has fitted thereinside a tubular jack 23 which is cylindrical in shape and fitted for telescopic movement up and down in sleeves 21. The lower end of jacks 23 are each connected to a piston mounted in a double acting hydraulic thrust cylinder located in the upper end of columns 12 as will be explained hereinafter. By operation of the thrust cylinders, the jacks 23 may be raised or lowered independently as required for engagement with the ceiling of the mine shaft when the drill frame has been placed in the desired position and at the desired angle. It is to be understood that in drilling raise holes downwardly, the anchor means may be associated with the base end of the drill frame 11, as for example, by the use of bolt holes (not shown) connected to anchoring means embedded in the floor of the mine cavern.

Drill frame 11 has mounted therein for generally up and down movement therein a movable carriage means in the form of gear box 26 having a pair of guide arms 27 at each corner thereof, each of which is adapated to engage and be guided by a guide rail 28 mounted on each of the columns 12, such that gear box 26 may be moved up and down relative to guide rails 28.

The apparatus of this invention also includes power means connected to the drill frame for moving the carriage means up and down relative to the drill frame. These power means are preferably in the form of a pair of thrust yokes 31 mounted on the sides of the drill frame and provided with guide means on each end thereof in the form of guide lugs 32 which are adapted for sliding engagement with intermediate guide rails 33 connected to columns 12 such that yokes 31 are maintained in alignment with the drill frame when subjected to thrust forces as hereinafter explained. The power means also includes first thrust means connected between yokes 31 and drill frame 11 which conveniently take the form of two pairs of hydraulic first thrust cylinders 34, with one pair thereof mounted on one side of the apparatus and one pair mounted on the other side of the drill frame. The upper cases of cylinders 34 are attached to channels 14. Each of the cylinders 34 has operating therein a piston which is connected to a piston rod 35, the lower ends of which are connected on opposite ends of a thrust yoke 31.

The power means also includes second thrust means connected between the yoke means and the carriage means, which are conveniently shown in the form of a pair of hydraulic second thrust cylinders 38, one of which is mounted on one side of frame 11 and one of which is mounted on the other side thereof. The lower ends of cylinders 38 are attached to thrust yokes 31 for movement therewith and the upper ends thereof are supported for sliding movement by guide covers 39 which are generally square in cross-section and attached to cylinder 38 for movement therewith, such that cylinders 38 are free to move generally up and down but with the lateral movement thereof restricted by guide wear pads 42 mounted in channels 14 acting against guide covers 39.

Each of the cylinders 38 has a hydraulic piston therein which connects with a depending piston rod 40, the lower ends of which are connected to clevises 41 which are attached to gear box 26.

Cylinders 34 and 38 are connected to an appropriate pressurized hydraulic fluid source and arranged such that the application of fluid pressure to the upper ends thereof will cause piston rods 35 and 40 to be projected downwardly, thereby causing gear box 26 to be moved downwardly relative to drill frame 11. The application of fluid pressure to the lower ends of cylinders 34 and 38 will cause upward movement of gear box 26 relative to drill frame 11.

This arrangement of the double acting hydraulic cylinders allows telescoping the drill frame 11 to the skid position without removal or dismantling of the hydraulic cylinders. This thrust arrangement makes possible the use of standard cylinders in the place of telescopic cylinders to obtain the low drill frame height during movement from one location to another.

The apparatus also includes rotary drive means mounted in gear box 26 for rotation of a rotary drill string. The drive means includes fluid motor means connected to the gear box 26 and means for supplying pressurized fluid to the motors from a remote source.

Preferred embodiments of the apparatus also include pipe joint wrench means which are associated with the drill frame for holding the drill string from rotation when adding and removing sections of the drill string. These wrench means generally include an upper chuck means in the form of upper chuck assembly 43 connected to the upper end of drill frame 11, and lower chuck assembly 44 mounted for rotation with the rotary drive means in gear box 26. These chuck assemblies are for the purpose of holding the drill string and sections thereof during make up and breakout operations and will be explained in greater detail hereinafter.

Preferred embodiments of the apparatus also include pipe loading means connected to drill frame 11 for supporting pipe sections during addition and removal of the pipe sections in the drill string. This pipe load means conveniently takes the form of pipe load arm 46, the lower end of which is pivotally connected to drill frame 11 for movement through a plane which is generally parallel with the long axis of drill frame 11. This arrangement is advantageous in that the pipe load arm will tilt with the drill frame during the drilling of battered holes, for example.

Certain embodiments of the apparatus may also include drill stem guide means connected to the drill frame for guiding the drill stem during initial drilling operations. Referring to FIG. 1, these guide means are conveniently shown as a pair of generally V-shaped guide supports 48, the ends of which are connected to the upper end of one of the jacksleeves 21. Guide supports 48 have secured thereto a pair of drill guide sections 49 having a plurality of guide rollers 50 mounted for rotation on generally vertical axes and which are adapted for engaging and guiding starting sub 55 when in the engaging position as shown in FIG. 1. It is to be understood that sections 49 are normally placed in position when drilling operations are commenced in drilling a raise hole upwardly, and once the correct drilling angle has been established they are pivoted out of the way.

The apparatus may also include drill stem centralizer means which are connected to the drill frame for selectively engaging and positioning the drill stem during make up and breakout of the drill stem, which centralizer means are particularly useful during the drilling of holes which deviate from the perpendicular, which are commonly referred to as battered holes. These centralizer means are best shown in FIG. 8 and include hydraulic cylinder 52 connected to the upper end of drill frame 11, and has a piston therein which is adapted to operate piston rod 53 having an engaging head 54 which is adapted to contact drill stem or drill string and move it to a central position from whence it may have moved during the drilling of battered holes, for example.

Figure 15:
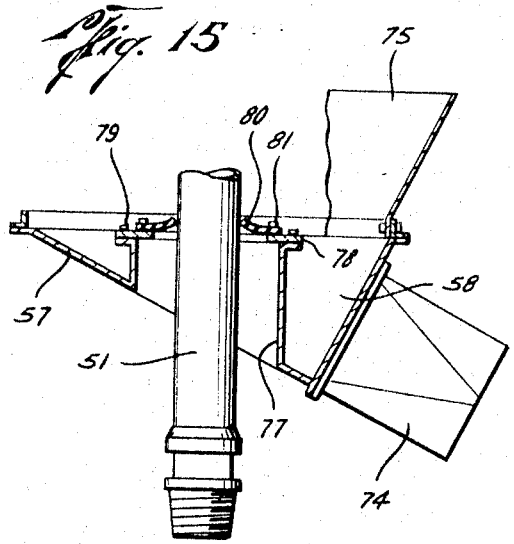
FIG. 15 is a partial sectional view of the split hopper assembly which is mounted in the upper end of the drill frame for collecting and diverting drilling residue.

The apparatus may also have demountable hopper means associated with the upper end of drill frame 11 for collecting and diverting drill residue during upward drilling operations. These hopper means are shown in the form of a split hopper 56 comprised of two hopper sections 57 and 58 held together by bolts 59 as best shown in the upper end of FIG. 9, which sections are adapted for demounting from the drilling apparatus while the drill string is supported in the drill frame. Hence, the hopper means may be placed in position when the drilling operation is commenced and removed immediately before the drilling operation is terminated, thereby permitting the removal of the large reaming bit prior to dismantling of the apparatus. The hopper means are useful during drilling of raise holes extending upwardly whereby the drilling residue, including the muck, water and air, may be collected and diverted to an appropriate collecting point. Rock deflectors 75, as shown in FIGS. 3 and 15, may be added to increase the effectiveness of the hopper.

Figure 8:
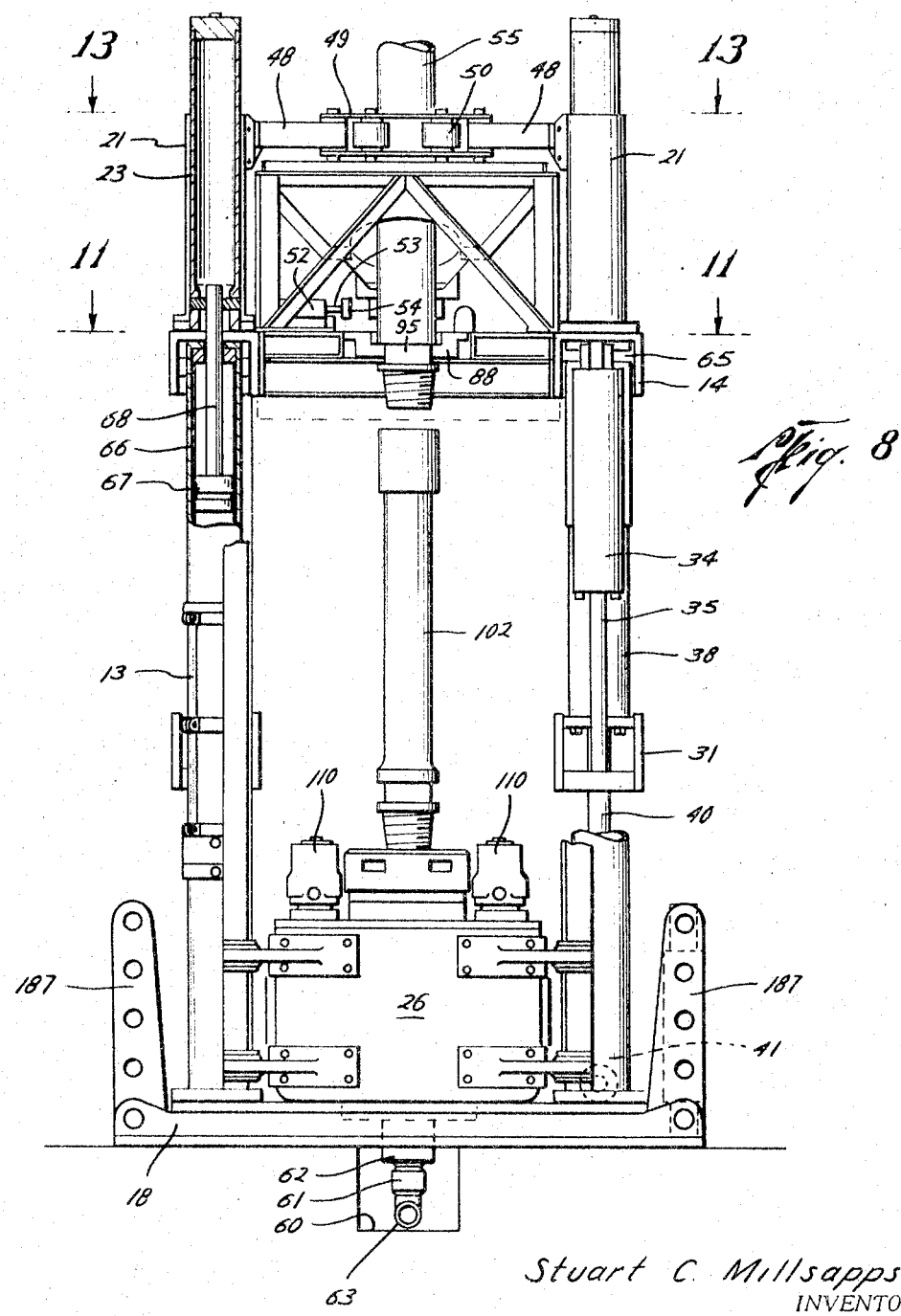
FIG. 8 is a front elevation view of the apparatus shown in FIG. 1.

FIG. 8 shows a front view of the apparatus shown in FIG. 1, as it would be installed for drilling a perpendicular raise hole upwardly. Lower base 18 is shown supported on the floor of the mine which floor has a small pit 60 provided therein in which swivel 61 and kelly nut 62 depend. Flexible hose 63 is connected to swivel 61 at one end and to a source of drilling fluid at the other end, which source is normally provided in mine shafts. This fluid may be either air or water or a combination thereof, which drilling fluid is directed upwardly through kelly nut 62, kelly 64 and through the drill string as will be explained hereinafter.

The right hand column 12, as shown in FIG. 8, is partially broken away to show the arrangement of the thrust cylinder means including yoke 31, depending piston rod 40 connected at its lower end to clevis 41, which is connected to gear box 26. Above yoke 31, a piston rod 35 is shown attached thereto and extending upwardly therefrom and depending from upper cylinder 34, the upper end of which is connected by load bearing pin 65 to channel 14.

The left column 12, as viewed in FIG. 8, is also partially broken away at the top end thereof and shows the arrangements of a hydraulic jack cylinder 66 mounted inside of the upper end of column 12, having a piston 67 and piston rod 68, which in turn connects to tubular roof jack 23 which, as previously explained, is adapted for movement up and down inside of jacksleeve 21.

Just below cylinder 66, removable column sections 13 are shown mounted about the elongated slip joints in columns 12. Reference to FIG. 12 will more clearly show the arrangement of these slip joints, where column section 13 are shown removed and columns 12 only partially expanded. Columns 12 are each formed with top and bottom halves, with the top halves having internal slip joint tubes 37 mounted therein which telescope into the bottom halves. When columns 12 are fully expanded, removable column sections 13 can be bolted in place thereabout, completing the frame structure and guide rails 28.

Figure 13:
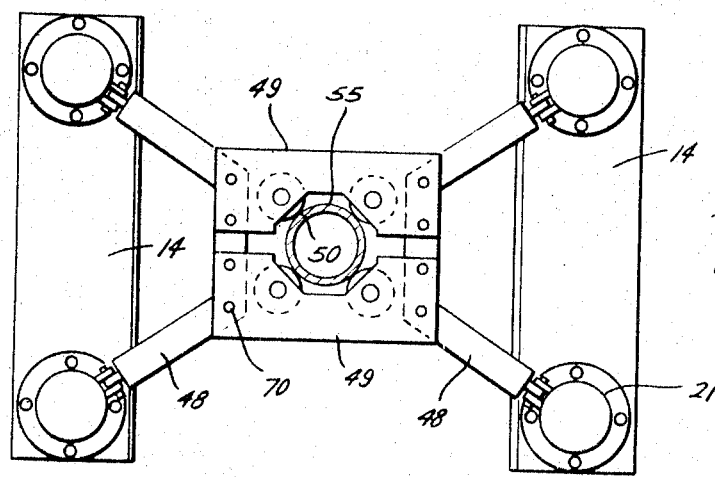
FIG. 13 is a view generally taken along line 13—13 of FIG. 8 showing the drill guide means of the invention.

Referring again to FIG. 8, drill stem guide supports 48 are shown connected to jacksleeves 21 and supporting drill guide sections 49 which have mounted therein the drill guide rollers 50, which are adapted to surround and guide starting sub 55 during the initial drilling operation so that the bore hole can be started at the desired angle and in a line parallel with the long axis of drill frame 11. This arrangement of drill stem guide means is further shown in FIG. 13. As previously explained, drill guide sections 49 are clamped to supports 48 by a plurality of bolts 70, such that after the bore hole has been correctly started at the proper angle, all of the bolts 70 may be removed from each section 49 with the exception of one, whereby the sections may be pivoted outward from the drill stem generally through horizontal planes such that rollers 50 are removed from intimate contact with the drill string so that pipe stabilizers may be passed upwardly therethrough.

Refering now to FIGS. 8, 9 and 15, in particular, split hopper 56 is shown installed immediately below drill guide sections 49 and is comprised of split hoppers sections 57 and 58 which are connected to and supported by removable frames 71 and 72 respectively which are bolted together as by bolts 73, such that the split hopper assembly may be removed from drill frame 11 before the drill stem is removed therefrom. Hopper section 58 has attached thereto chute 74 which directs the drill residue to an appropriate accumulation point.

Referring now to FIG. 15, each of the hopper sections 57 and 58 is provided with a semi-circular portion along the edge facing drill string 51 which together form stand pipe 77 which generally surounds drill string 51. The upper end of stand pipe 77 supports and has connected thereto at the upper end thereof split ring 78 by means of bolts 79. It is to be understood that split ring 78 is annular in shape and has an internal diameter larger than the external diameter of any portion of the drill string 51 with the exception of the reaming bit. Split ring 78 supports thereabove an annular seal means in the form of a unitary, continuous, annular rubber seal wiper 80 which is connected thereto by bolts 81. Wiper 80 is installed after the hopper 56 has been installed and is done so by placing wiper 80 around a section of drill string 51 and then moving drill string 51 upwardly until it passes through stand pipe 77 at which point it may thereafter be connected to stand pipe 77 by use of split ring 78 and bolts 79 and 81. It is understood that hopper sections 57 and 58 and integral stand pipe sections 77 are provided with flanges between which a rubber gasket (not shown) is placed prior to assembling hopper sections to make the hopper water tight. There is thus provided a sealing means whereby return drilling fluid and drill residue may be diverted to hopper 56 and out rock chute 74, thereby providing cleaner drilling conditions for the apparatus and safeguarding wear on the various parts of the apparatus which would otherwise be caused by the drill residue.

Figure 14:
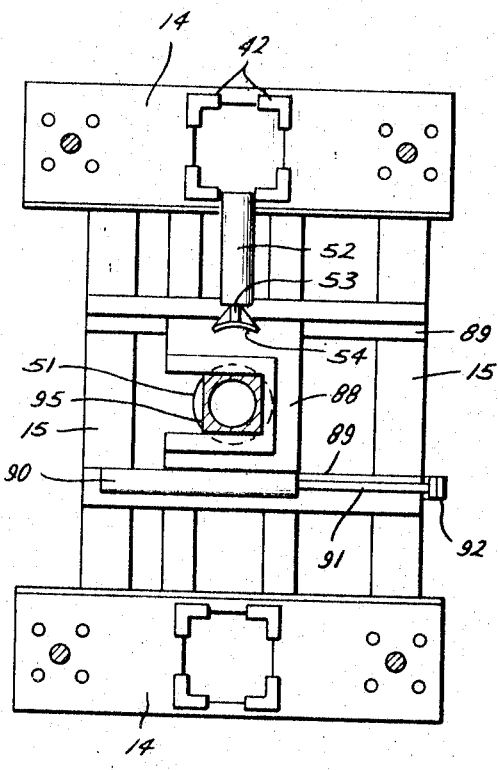
FIG. 14 is a view taken generally at line 14—14 of FIG. 9 showing the drill stem centralizer means and upper chuck means of the invention.

Referring now to FIGS. 8, 9 and 14, in particular, drill pipe centering means are installed immediately below the aftersaid hopper means and conveniently take the form of hydraulic cylinder 52 having a piston therein connected to piston rod 53, the leading edge of which is attached to a head 54 which may be generally arcuate in shape along the leading edge thereof for engaging and centering drill string 51. This pipe centering means is particularly useful in drilling battered holes whereby the drill string 51 can be maintained in a center position in the drill frame during make up and breakout of drill string 51.

Also shown in FIGS. 1, 8, 9 and 14 in particular, are upper chuck means in the form of a generally C-shaped upper chuck 88 which is adapted for generally horizontal movement on guide rails 89 mounted on upper frame members 15. Chuck 88 has an extension on which chuck operator air cylinder 90 is mounted for movement therewith. Cylinder 90 is provided with appropriate piston means connected to piston rod 91 the opposite end of which is attached to stud 92 which is fixedly connected to an upper frame member 15. Hence, by application of air to opposite ends of cylinder 90, chuck 88 may be moved to and from the engaging position in which it is shown in FIG. 14.

The size of chuck 88 is selected such that it will engage drill string 51 as particularly shown in FIG. 8, and more particularly, will engage a chucking square 95 on the lower end of a section of the drill string 51. Chucking square 95 is generally square in cross-section and is of a smaller cross-sectional area than flange portion 96 immediately thereabove, as shown in FIG. 8. Hence, drill string 51 may be passed upwardly through the drill frame until a chucking square 95 is adjacent to upper chuck 88, at which point chuck 88 may be moved to the engaging position shown in FIG. 14 and thereafter gear box 26 may be lowered slightly, thereby transferring the weight of the drill string 51 to chuck 88. The drilling apparatus is now in condition for the addition of another section of drill string as will be explained hereinafter.

Referring now to FIGS. 1, 9 and 10, in particular, pipe load arm 46 is connected at its lower end for pivotal movement with the upper ends of a pair of arm supports 98, the lower ends of which are connected to upper base 17, such that when drill frame 11 is tilted, support arms 98 tilt therewith such that pipe load arm 46 will always be adapted for movement through a plane which is generally parallel with the long axis of drill frame 11. Means for moving load arm 46 through the aforesaid plane includes hydraulic cylinder 99, having piston rod 100 connected to the lower side of arm 46, and with the lower end thereof connected to base 17.

FIGS. 1 and 9 show load arm 46 supporting a typical section 102 of the drill pipe utilized with this apparatus. Section 102 is provided with the usual box end 103 and pin end 104 for make up with adjacent sections. However, immediately above pin end 104, each of the sections 102 is provided with the aforesaid chucking square 95 which is generally square in cross-section but having the corners thereof angled such that upper chuck 88 may readily be engaged therewith. Immediately above chucking square 95, each section is provided with enlarged flange 96.

Section 102 is supported on load arm 46 for movement to and from the add on position by means of two pairs of gripper fingers 106 which are pivoted to and from the closed position about section 102 by means of air cylinders 107 as best shown in FIG. 10. One pair of gripper fingers 106 supports section 102 just below the square shoulder provided at box end 103. This shoulder prevents the pipe from slipping through the grippers when it is raised to the generally vertical position and still permits rotation of section 102 when held in the vertical position. It is understood that should the drill pipe be of external flush outside diameter design, then a shallow groove would be placed at the box end shoulder location or at the pin end of the drill pipe. Lugs provided in the gripping fingers would then support the pipe in the generally vertical position, as might occur when drilling downwardly.

Referring now in particular to FIGS. 1, 8 and 11, and as previously explained, gear case 26 is provided with fixed guide arms 27, each of which is designed to engage for sliding movement with a guide rail 28 mounted on each of the columns 12, whereby gear box 26 is at all times centrally positioned in drill frame 11 for generally vertical up and down movement therein. Gear box 26 has mounted thereon fluid motor means in the form of four hydraulic motors 110 which are adapted to be supplied with a remote source of pressurized fluid which may conveniently take the form of power plant 111 shown in FIGS 5, 6 and 7 which plant is adapted to provide pressurized fluid to motors 110 via fluid pressure hose 112. Hydraulic motors 110 are the preferred source of rotational power because of their compact size relative to torque out-put, plus the fact that by the use of hydraulic motors, the pressurized fluid source may be remotely located, as for example in power plant 111 which is conveniently shown as mounted on rail car 114 and which may be left standing on the rails some 50 to 60 feet from drill frame 11 during the drilling operation. It is understood that power plant 111 may also furnish pressurized fluid to power roof jacks 23, pipe load arm 46 and thrush cylinders 34 and 38.

Figure 6:
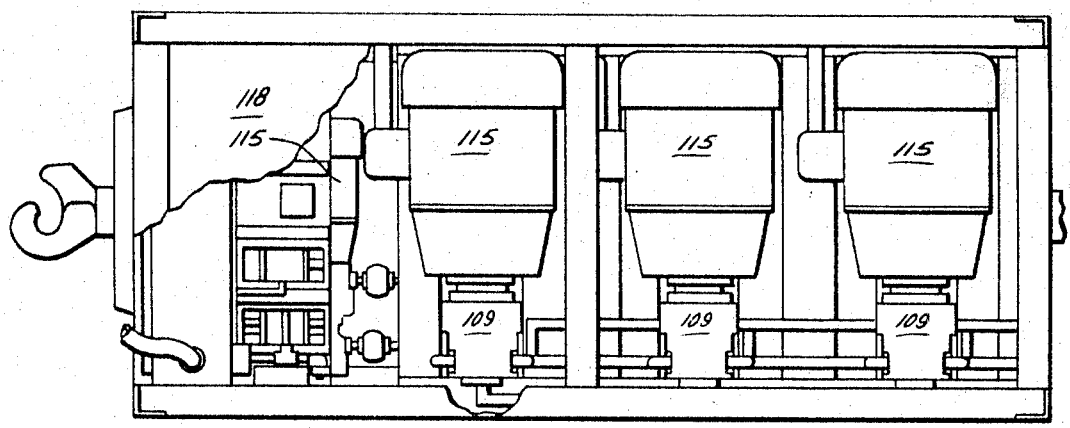
FIG. 6 is a top plan view, partially broken away, of the rail car shown in FIG. 5.
Figure 7:
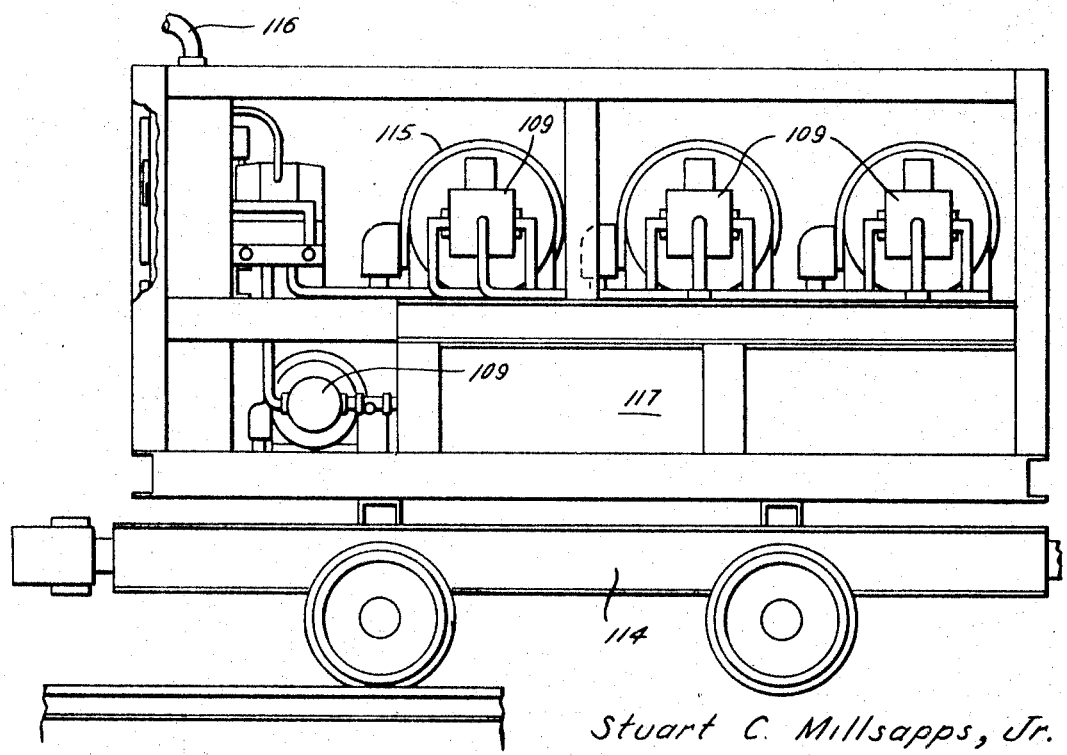
FIG. 7 is a side elevation view, partially broken away, of the rail car shown in FIG. 6.

Referring more particularly to FIGS. 5, 6 and 7, power plant 111 is mounted on rail car 114 and is generally comprised of a frame assembly having a plurality of electrical motors 115 which are supplied with electrical power via conduit 116 from any convenient source and drive one or more hydraulic pumps 109. Power plant 111 may also include one or more hydraulic reservoirs 117 and one or more air pressure tanks which may be connected by appropriate flexible conduits to the various cylinders of the apparatus. Power plant 111 is constructed so that it may be mounted on a standard mine rail car and may be provided with an appropriate steel cover 118 to protect the power equipment therein from falling rocks and the like.

Referring now to FIG. 16, another gear box similar to that shown in FIG. 11 is shown and which is provided with a rear door entryway thereinto rather than with a top cover plate, but in other respects and in functions and operations is the same.

Referring now more specifically to FIGS. 16 and 20, kelly 64 is generally square in cross-section and has axial bore 122 therethrough for passage of drilling fluid during drilling operations.

As best seen in FIG. 20, kelly 64 is mounted for rotation in hollow shaft 123 which is supported in gear case 26 by upper and lower annular thrust bearings 124. The upper end of kelly 64 has connector means for connecting to the drill string which means conveniently take the form of rotary head 126 which is welded thereto for rotation therewith and saver sub 127 which is mounted inside rotary head 126 by pins 128. Saver sub 127 is provided with internal threads for make up with the pin end of drill pipe sections 102.

The lower end of kelly 64 has attached thereto stop nut 62 by means of pins 133. In the position shown in FIG. 20, stop nut 62 is mounted on kelly 64 such that there is approximately two inches of free movement of kelly 64 up and down in shaft 123 and relative to gear case 26, which free play is useful during make up and breakout operations as will be explained hereinafter.

Shaft 123 has keyed thereto large diameter gear 136 which is adapted to be rotated by large pinion 137 which is keyed to intermediate shaft 138 mounted for rotation in gear box 26 by means of upper and lower bearings 139. Shaft 138 has keyed thereto intermediate gear 142 for rotation therewith.

Referring now to FIGS. 16, 17, 18, and 19, additional details of the apparatus will be described. FIGS. 17 and 18 show an oil flow line 215 connected to receive oil from an oil pump (not shown) and to H fitting 216 at the other end. Fitting 216 directs oil through oil filter 217 to outlet oil line 218, leading into gear box 26 as shown in FIG. 19, for the purpose of providing oil to the bearings therein. Another leg of H fitting 216 has mounted thereon pressure relief valve 219. The other leg of fitting 216 has connected thereto oil pressure responsive switch 220, which provides a signal over electrical cable 221 to an appropriate light or other warning device (not shown) when oil pressure drops below a predetermined level.

Referring now to FIG. 21, one of the hydraulic motors 110 is connected to rotate drive shaft 144 and another to rotate drive shaft 145, each being mounted in appropriate bearings. Each of the drive shafts 144 and 145 is provided with a small pinion 146 which is adapted to engage and rotate small gear 147 mounted on small shaft 148 mounted for rotation in gear box 26 by means of upper and lower bearings 149. Shaft 148 is provided with intermediate pinion 150 which is arranged for driving engagement with intermediate gear 142 shown in FIG. 20.

Referring now to FIG. 22, the gear arrangement therein is similar to that explained in FIG. 21 and for purposes of convenience the parts therein are designated by the same reference numerals. In this instance, one of the motors 110 drives a shaft 144 which turns shaft 148 through appropriate gear connections. Similarly, another of the motors 110 is connected to rotate drive shaft 145 which similarly is arranged to rotate shaft 148. Shaft 148 is provided with an intermediate pinion 150 which similarly drives intermediate gear 142 shown in FIG. 20.

FIG. 19 shows a door 153 which provides access to the inside of gear box 26. It is to be understood that hydraulic fluid is supplied to motors 110 via hydraulic manifold 154 shown in FIG. 20 which is connected by appropriate flexible conduits to a source of hydraulic pressure which may be remotely located, as explained above.

Referring now in particular to FIGS. 1, 16, 20 and 23, the details of another of the wrench means will be described in detail. This includes lower chuck means which includes annular chuck ring 161 having vertically extending internal lugs 162 for engagement with and relative axial movement with mating slots provided in the peripheral surface of rotary head 126. Chuck ring 161 has two pairs of transverse openings 163 therethrough for insertion of key wrenches 164. It is to be understood that wrenches 164 may be joined together in the shape of a U as shown in FIG. 1. When wrenches 164 are inserted in openings 163 as shown in FIG. 23, chuck ring 161 is thereby keyed to the chucking square of drill pipe section 102, such that by rotation of chuck ring 161, pipe section 102 is likewise rotated, whereby the upper end thereof may be made up with or broken out from a drill pipe section 102 supported thereabove in upper chuck 88. Chuck ring 161 is generally co-axially aligned with kelly 64 and rotates therewith, either clockwise or counterclockwise. It is to be understood that motors 110 are of the reversible type such that kelly 64 may be rotated in either direction.

Thrust means are provided for moving chuck ring 161 to and from the engaging position or operating position. These means are best shown in FIGS. 16 and 23. A pair of jack cylinders 167 are mounted on top of gear housing 26 with one spaced on either side of chuck ring 161 and provided with pressurized fluid on the lower end thereof from any convenient source. Each of the cylinders 167 has mounted for vertical movement therein a piston 168 which is attached to an upstanding piston rod 169 the upper end of which is connected with and supports an external sleeve 170 which is adapted for sliding movement up and down on the outside surface of cylinder 167. Sleeve 170 is also slidably keyed to cylinder 167 to prevent rotation of sleeve 170 relative to cylinder 167. Each of the sleeves 170 has mounted on the chuck ring side thereof a lug 171 carrying a roller 172 which is adapted to engage the lower annular end surface of chuck ring 161 and to carry chuck ring 161 axially upwardly therewith upon actuation of piston 168. In the raised position as shown in FIG. 23, key wrenches 164 may thereafter be inserted in openings 163, such that chuck ring 161 and, hence, kelly 64 are connected with drill pipe section 102. Rotation of kelly 64 will thereby cause rotation of drill pipe section 102 to either make up or breakout the upper end of pipe section 102. During rotation of chuck ring 161, it is supported by rollers 172. Once the make up or breakout operation has been completed, wrenches 164 may thereafter be removed and pressure relieved on cylinder 167 whereby sleeve 170 is retracted and chuck ring 161 returns to the inoperative position, i.e. moves downwardly as shown in FIG. 23.

During movement of the drill frame 11 in the mine, or from one location to another where the height of the drill frame must be reduced to a minimum, it will be collapsed to the position shown in FIG. 4, and preferably mounted upon skid 175 having toe eyes 176 on the ends thereof. Skid 175 has upwardly extending lugs 177 which are connected by tie bolts 178 to the underside of gear box 26 and is secured near the ends thereof by attaching bolts (not shown) to the lower portions of columns 12. It is to be understood that columns 12 will be collapsed with the removable column sections 13 shown in FIGS. 1 and 12 removed therefrom. It will also be observed in FIG. 4 that the structures above channels 14 have been removed to lower the silhouette of the apparatus. In addition, upper frame members 15 each may have a pair of eye bolts 181 connected thereto which may be used in skidding or otherwise moving drill frame 11, as will be described hereinafter.

Referring now to FIG. 2, the apparatus can be installed in a mine cavern 183, for example, and positioned vertically so as to drill a vertical raise hole. It will be anchored in position by anchor jacks 23 and chute 74 will be connected to an appropriate rock pipe 184 which is connected for diverting the drilling residue to a gondola rail car 185 runnning on rails located in the main mine tunnel. It is to be understood that power supply rail car 114 may conveniently be located on the same tract and thereby be remotely located from the drill frame 11.

If it is desired to drill a raise hole at an angle, drill frame 11 would be positioned as shown in FIG. 3. The apparatus of this invention is particularly useful in that it may be tilted in either of two directions, and this is accomplished by providing upper base 17 with upwardly extending adjusting arms 187 on each corner thereof, which arms have a plurality of transverse pin holes therethrough at different heights levels, as shown in FIG. 1 and FIG. 3. Upper base 17 is arranged for pivotal connection at either end thereof with lower base 18 by means of pivot pins 188 which may be inserted through the ends of bases 17 and 18 which are on the side in the direction to which the drill frame is to be tilted. The drill frame is tilted to the desired angle by utilization of the removable tilting tool 189.

This drilling operation is accomplished by initially raising gear box 26 to an upward position in drill frame 11. Removable tilting tool 189 is then placed under the gear box clevis 41 on the side of the drill frame which is away from the direction of the desired tilt, as shown in FIG. 3. Thereafter by causing gear box 26 to move downwardly by operation of the thrust cylinders, the right side of the drill frame, as shown in FIG. 3, is raised thereby tilting the drill frame to the desired position. This tilting operation can be performed either before or after the roof jacks and other assemblies above channels 14 are installed. In any event, after installation of the upper assemblies, roof jacks 23 may be engaged as previously described and the apparatus is then placed in the position for commencement of the drilling operation at the desired angle. It is to be understood that tilting tool 189 may be removed after jack screw couplings 190 have been extended and appropriately pinned to the appropriate arms 187, as shown in FIG. 3. Jack screw couplings 190 are thereafter locked in place with lock nuts 191 on the upper and lower ends thereof, as better seen in FIG. 1.

In operation, the drill frame 11 is skidded to the drill site, in the collapsed condition shown in FIG. 4. Hydraulic hoses are then connected from power plant 111 to the thrust cylinders 34 and 38. The slip joints of columns 12 are then expanded upwardly by the application of pressure to the upper ends of thrust cylinders 34 and 38, which in turn raise the upper ends of columns 12, channels 14 and frame members 15.

After extending the drill frame columns 12 to the full height, chains may be fastened from the roof bolts in the mine cavern (not shown) to eyebolts 181 connected to frame members 15, and the lower ends of columns 12, gear case 26 and skid frame 175 may be raised by reversing the fluid flow in hydraulic thrust cylinders 34 and 38. With the lower end of columns 12 thus raised, upper base 17 and lower base 18 may be installed thereunder by attaching upper base 17 to the flanges at the lower ends of columns 12. Bolts 178 which attach skid 175 to lugs provided on the bottom of gear case 26 and bolts (not shown) which attach skid to lower ends of columns 12 are then removed, gear box 26 raised, and skid 175 removed. If the drill frame is to be tilted, then tilting tool 189 may be used as described above.

After securing the lower ends of columns 12 to upper base 17, the top frame may be lowered and the hopper assembly, centralizer assembly, drill stem guide assembly and roof jack assembly may be installed. Thereafter, the top portion of the drill frame 11 may once again be moved to the utmost position at which point removable column sections 13 may be installed, at which point the apparatus is ready for drilling.

Pilot hole operation is begun by screwing the bit sub, with pilot bit attached, into saver sub 127, raising sub 127 by movement of gear case 26 upwardly to the top frame level and engaging upper chuck 88 with the chucking square provided on the bit sub. Sub 127 is then unthreaded by reverse rotation thereof and gear case 26 is then lowered in drill frame 11. Rubber seal wiper 80 is then placed about a flush outside diameter starting sub 55, which is a section of pipe with a uniform diameter equal to the diameter of the box ends of section 102 that make up the balance of the drill string, which is held in gripping fingers 106 of pipe load arm 46, in the same manner that section 102 is shown in FIG. 1. Starting sub 55, with seal 80 thereabout, is then raised to the vertical position by operation of load arm 46 with fingers 106 acting as guides. Gear case 26 is thereafter raised and kelly 64 thereafter rotated so as to make up the pin end sub 55 in saver sub 127. Rotation is continued and starting sub 55 is raised with fingers 106 still acting as guides until the box end thereof is made up with the pin end of the bit sub thereabove. Fingers 106 on pipe load arm 46 can thereafter be opened and the load arm 46 lowered. Thus made up, starting sub 55 may then be raised by raising on gear case 26 sufficiently so that the drill bit will contact the rock and the drill stem guide sections 49 rotated into position and fixed in place by the installation of bolts 70.

Drilling operations may then commence and as the drill bit progresses upwardly, rubber wiper 80 passes through pipe stand 77 of hopper 56 at which time it may be bolted in place as shown in FIG. 15 by using split ring 78 and bolts 79 and 81.

The pilot hole can then be drilled by adding successive pipe sections 102 by use of load arm 46 until the drill bit breaks out in the upper drift. It is to be understood that drill stem stabilizers somewhat larger in diameter than the drill stem may be run below the pilot bit sub. Stabilizers may be substituted for starting sub 55 after the pilot hole is started. It is also to be understood that upper fingers 106 of load arm 46 surround drill sections 102 in loose fitting relation and hold the sections 102 from axial movement by engaging the lower end of the tool joint or box end 103. Since starting sub 55 has no upset tool joint, it is held from axial movement in fingers 106 by a chain wrapped thereabout.

The pilot bit is then removed in the upper level after break through and a large reaming bit attached to the stabilizer. The reaming process is accomplished by applying downward thrust to the drill stem and removing successive sections of drill pipe as the reaming progresses downwardly.

Referring now to FIGS. 24A, 24B, and 24C, the breaking out of tool joint sections 102 in the drill string will now be explained. The drill hole is reamed down until the chucking square 95 on the following pipe section 102 is at the level of upper chuck 88. Drill stem centralizer cylinder 52 is actuated thereby causing centralizer head 54 to engage the drill stem to center the drill stem in the upper frame. Chucking square 95 is then engaged by movement of upper chuck 88 to the position shown in FIG. 24A, and the weight of the drill string is transferred to chuck 88 by moving gear case 26 downward slightly. It will be remembered that kelly 64 is arranged for axial movement in drill case 26 within small limits.

The lower pin end 104 of lower pipe section 102 is broken by reversing the rotation of saver sub 127 and rotary head 126. In the event that box end 103 of lower section 102 should start to break first, than a hand wrench may be engaged in chucking square 95 of lower section 102 to prevent rotation thereof until pin end 104 has been disconnected from saver sub 127 in rotary head.

Box end 103 of section 102 is then broken by raising chuck ring 161 and fitting breakout key wrenches 164 into the openings 163 of chuck ring 161 and into engagement with chucking square 95 of lower section 102 as shown in FIG. 24B. In this manner, section 102 is keyed to chuck ring 161.

At this point, pipe load arm 46 is raised and fingers 106 clamped around section 102. Reverse rotation of rotary head 126, and hence chuck ring 161, will unscrew box end 103 from the pipe section 102 thereabove.

Gear case is then lowered until the weight of the pipe section to be removed is supported by the upper gripper fingers 106 against the box end shoulder. Then key wrenches 164 may be removed from ring 161 and chuck ring 161 thereafter lowered. Pipe load arm 46 may then be moved to the horizontal position thereby removing the pipe section 102 from the drill frame.

Thereafter, gear housing 26 and rotary head 126 may be raised to the upper position, as shown in FIG. 24C, and saver sub 127 made up with the pin end of section 102 supported in upper chuck 88 by rotation of rotary head 126. The drill string is then raised slightly by upward movement of gear case 26 to remove the load from upper chuck 88, and hydraulic centralizer cylinder 54 actuated to remove the side load from chuck 88, which can then be retracted. It is to be understood that the centralizer means is also used to center the drill pipe during the chucking operation. The foregoing cycle is then repeated until reaming is completed. Reaming is continued until the bit breaks through the rock ceiling. Split hopper 56 and seal 80 are then removed and the chucking square provided on the bit shank is engaged with upper chuck 88.

Thereafter, base 17 may be lowered, removable column sections 13 removed and skid 175 installed and the drill frame 11 lowered to the skid position.

FIG. 26 shows in greater detail the arrangement of centralizer cylinder 52 shown in FIG. 14. Centralizer head 54 is connected to piston sleeve 201 and piston rod 202. Sleeve 201 is adapted for telescopic movement inside cylinder 52 and rod 202 is connected to a piston mounted in fluid cylinder 203 mounted co-axially with cylinder 52. Cylinder 203 is adapted for application of fluid pressure alternately to either end to cause head 54 to move to and from the contacting position.

While the raised drill described above is used to drill a pilot hole up and ream the finished hole down, another embodiment of the apparatus is adapted for drilling down and reaming up and utilizes certain of the inventive features herein, as will be explained hereinafter. In such installation, the gear box 26, the thrust yoke, the breakout chuck mechanism, the adjustable base, and remote power unit can be used interchangeably.

FIG. 25 is a partial view similar to FIG. 20, but showing the apparatus adapted for drilling a raise hole downwardly. In this embodiment, kelly 64 has kelly nut 62 located on the top end thereof, which in turn connects to inverted swivel 61, which is adaptable for connection to a source of drilling fluid. The lower end of kelly 64 has rotary head 126 and saver sub 127 connected thereto. Similarly, chuck ring 161 is inverted and supported on the lower side of gear case 26. Hence, the device shown in FIG. 25 may be used to drill downwardly, since the operation thereof is essentially the same as drilling upward. Chuck ring 161 shown in FIG. 25 has the additional feature of a spring retained plunger lock pin 165 which connects chuck 161 to rotary head 126 in the position shown. Plunger lock pin 165 is disengaged from rotary head 126 to extend chuck ring 161 to the breakout position, which travel downward is limited by stop ring 166 engaging upper ends of splines on rotary head 126. Chuck ring 161 may then be retracted to the position shown by retracting jack cylinders inside sleeves 170 which have been modified to receive fluid to the rod ends or lower ends thereof.

In addition, when drilling downwardly, chuck 88 must be located on upper base 17 of drill frame 11 and shoulder means or grooves must be provided at the pin end of drill sections 102 to support sections 102 in load arm 46. Also, to provide maximum thrust for reaming up, it is preferred to anchor cylinders 34 to upper base 17 and locate thrust cylinders 38 on yoke 31 with the rod end up. This may be accomplished simply by turning the yoke and thrust cylinders upside down from the position shown in FIG. 1.

FIG. 27 shows an alternate embodiment of certain portions of the invention, and particularly alternate forms of the telescoping frame, yoke means, and upper chucking means. FIG. 27 is a partial side elevation view which is similar to the view shown in FIG. 9 and generally corresponds with the apparatus shown therein. In this embodiment, the yoke means are enlarged and shown in the form of U-shaped yoke 206 which is connected to the lower ends of cylinder 38 and piston rods 35 in the same manner as shown in FIG. 9. However, yoke 206 has both upper and lower V-shaped guide shoes 207 on each end thereof which run on intermediate guide rails 33. Hence, this embodiment will withstand greater thrust forces than that shown in FIG. 9. Removable column sections 13 in this embodiment also carry sections of guide rails 28 to guide carriage 26 up and down in the frame, and also guide rails 33 for engagement by guide shoes 207.

Further, in this embodiment, columns 12 are held in the raised position by load pins 211 between the telescoping sections. The result is that removable column sections 13 need not be relied upon to be weight or thrust bearing, but merely provide the required guide rails.

In addition, the upper chuck means is so arranged that air cylinder 90 is connected to stud 92 and piston rod 91 is connected to chuck 88 by means of lug 214 projecting upwardly therefrom. This permits mounting of cylinder 90 on a stationary base for more dependable operation.

It is to be understood that the apparatus of this invention can be operated by appropriate electrical controls from a remote location.

Further modification may be made in the invention as described without departing from the scope thereof. Accordingly, the foregoing description is to be construed as illustrative only and is not to be construed as a limitation upon the invention as defined in the following claims.

What is claimed is:

1. In raise drilling apparatus, the combination comprising:
   a drill frame having a base and an upper end;
   movable carriage means mounted for generally up and down movement in said drill frame;
   power means connected to said drill frame for moving said carriage means up and down relative to said drill frame;
   rotary drive means mounted in said carriage for rotation of a rotary drill string;
   pipe joint wrench means associated with said drill frame for holding said drill string from rotation when adding and removing sections of said drill string, said wrench means including a chuck connectable to said drive means for rotation thereby and adapted for engaging a pipe section during make up and breakout of said drill string;
   and thrust means connected to said carriage for moving said chuck axially relative to said rotary means, whereby said chuck is moved to and from the engaging position.

2. In raise drilling apparatus, the combination comprising:
   a drill frame having a base and an upper end;
   movable carriage means mounted for generally up and down movement in said drill frame;
   power means connected to said drill frame for moving said carriage means up and down relative to said drill frame, said power means including a yoke having first thrust means connected to said drill frame for effecting relative movement therebetween and second thrust means connected to said carriage means for effecting relative movement therebetween;
   rotary drive means mounted in said carriage for rotation of a rotary drill string;
   and pipe joint wrench means associated with said drill frame for holding said drill string from rotation when adding and removing sections of said drill string.

3. The apparatus as claimed in claim 2 including:
   a pair of yokes, each of which is mounted on opposite sides of said drill frame;
   said first thrust means includes two pairs of first thrust cylinder means each pair of which is mounted on opposite sides of said drill frame and connected between an end of said drill frame and one of said yokes;
   and said second thrust means includes a pair of second thrust cylinder means, each of which is connected between carriage and one of said yokes.

4. In raise drilling apparatus, the combination comprising:
   a drill frame having a base and an upper end, said base including upper and lower members, with said upper member being adapted for pivotal movement at both ends relative to said lower member for tilting said drill frame;
   movable carriage means mounted for generally up and down movement in said drill frame;
   power means connected to said drill frame for moving said carriage means up and down relative to said drill frame;
   rotary drive means mounted in said carriage for rotation of a rotary drill string;

and pipe joint wrench means associated with said drill frame for holding said drill string from rotation when adding and removing sections of said drill string.

5. In raise drilling apparatus, the combination comprising:
a drill frame having a base and an upper end;
movable carriage means mounted for generally up and down movement in said drill frame;
power means connected to said drill frame for moving said carriage means up and down relative to said drill frame;
rotary drive means mounted in said carriage for rotation of a rotary drill string, said drive means including a drive kelly mounted for rotation in said carriage and for relative axial movement therewith within predetermined limits;
and pipe joint wrench means associated with said drill frame for holding said drill string from rotation when adding and removing sections of said drill string.

6. The apparatus as claimed in claim 5 including:
a pipe load arm which is pivotally connected to said drill frame for tilting therewith and for movement through a plane which is generally parallel with the long axis of said drill frame, said arm being arranged for supporting pipe sections during addition to and removal of said pipe sections in said drill string.

7. The apparatus as claimed in claim 5 including:
pivotal drill stem guide means connected to said drill frame for guiding said drill stem during initial drilling operations.

8. The apparatus as claimed in claim 5 including:
drill stem centralizer means connected to said drill frame for selectively engaging and positioning said drill stem during make up and breakout of said drill stem during drilling of battered holes.

9. The apparatus as claimed in claim 5 wherein said drive means includes:
fluid motor means connected to said carriage means for rotating said drill string;
and means for supplying pressurized fluid from a remote source to drive said motor means.

10. The apparatus as claimed in claim 5 wherein said rotary drive means includes:
connector means for connecting one end of said kelly to one end of said drill string;
and fluid motor means connected to said carriage for rotation of said kelly.

11. The apparatus as claimed in claim 10 wherein:
said connector means is connected to the lower end of said drive kelly for rotation therewith and adapted for engaging a portion of a pipe joint during make up and breakout while drilling in a bore hole extending downwardly from said drill frame.

12. The apparatus as claimed in claim 5 including:
demountable hopper means associated with the upper end of said drill frame for collecting and diverting drill residue during upward drilling operations.

13. The apparatus as claimed in claim 12 wherein:
said hopper means comprises at least two hopper sections, which in the assembled condition form one hopper, said sections being adapted for demounting when said drill string is supported in said drill frame.

14. The apparatus as claimed in claim 13 including:
unitary, continuous, annular flexible seal means mounted above the bottom of said hopper means and adapted to resiliently engage the outside surface of said drill string for diverting drilling residue.

15. In mine raise drilling apparatus, the combination comprising:
a drill frame having a base, an upper section, and a plurality of upright members;
anchor means for securing said drill frame in a fixed position in said mine;
a movable carriage mounted in said drill frame and having guide means cooperative with said upright members to guide said carriage during up and down movement thereof;
power means connected to said drill frame for moving said carriage up and down relative to said drill frame, said power means including yoke means, first thrust means connected between said yoke means and said carriage means;
rotary drive means mounted in said carriage for rotation of a rotary drill string;
pipe loading means connected to said drill frame for tilting therewith and for supporting pipe sections during addition to and removal of said sections in said drill string at various drill angles;
and pipe joint wrench means associated with said drill frame for adding and removing sections of said drill string, said wrench means including a first chuck means connected to one end of said drill frame for engaging and supporting the drill string during make up and breakout of said drill string and second chuck means connected to said rotary drive for rotation thereby and adapted for engagement with a portion of a pipe section during make up and breakout of said drill string.

16. The apparatus as claimed in claim 15 wherein said rotary drive means includes:
a drive kelly mounted in said carriage for rotation therein;
connector means for connecting one end of said kelly to said drill string in rotational driving relationship;
and fluid motor means connected to said carriage for rotation of said kelly.

17. In raise drilling apparatus, the combination comprising:
a drill frame having a base and an upper section;
movable carriage means mounted for generally up and down movement in said drill frame;
power means connected to said drill frame for moving said carriage means up and down relative to said drill frame;
rotary drive means mounted in said carriage for rotation of a rotary drill string;
pipe joint wrench means associated with said drill frame for holding said drill string from rotation when adding and removing sections of said drill string, said wrench means including first and second chuck means, said first chuck means being adapted to support said drill string and hold said drill string from rotation when a section of said drill string is added and removed, and said second chuck being connected to said rotary drive means for rotation thereby and adapted to engage and rotate said section during make up and breakout of said section.

18. The apparatus as claimed in claim 17 including:
thrust means connected between said lower chuck means and said carriage for moving said chuck means up and down relative to said rotary means within predetermined limits to and from the pipe engaging position.

19. The apparatus as claimed in claim 18 wherein:
said pipe loading means includes a pipe load arm which is pivotally connected to said drill frame for tilting therewith and for movement through a plane which is generally parallel with the long axis of said drill frame.

20. The apparatus as claimed in claim 19 wherein:
said drill frame includes a plurality of telescoping upright members, whereby said frame may be raised and lowered by telescopic movement of said upright members.

21. The apparatus as claimed in claim 20 wherein said rotary drive means includes:
a drive kelly mounted in said carriage for rotation therein and for relative axial movement therewith within predetermined limits and having an axial bore for passage of drilling fluid therethrough;

connector means for connecting one end of said kelly to one end of said drill string;

and fluid motor means connected to said carriage for rotation of said kelly.

References Cited

UNITED STATES PATENTS

| | | | |
|---|---|---|---|
| 1,969,513 | 8/1934 | Kelley | 175—209 |
| 2,979,320 | 4/1961 | Adams | 299—31 X |
| 3,057,416 | 10/1962 | Carlson et al. | 173—34 |
| 3,145,786 | 8/1964 | O'Neill et al. | 175—8 |
| 3,220,494 | 11/1965 | Cannon et al. | 175—2 |
| 2,721,725 | 10/1955 | Biggs et al. | 175—20 |

CHARLES E. O'CONNELL, Primary Examiner
RICHARD E. FAVREAU, Assistant Examiner

U.S. Cl. X.R.

173—34, 37; 175—88